US010656034B2

(12) United States Patent
Schagerl et al.

(10) Patent No.: US 10,656,034 B2
(45) Date of Patent: May 19, 2020

(54) METHOD FOR OPERATING A DRIVING SIMULATOR

(71) Applicant: AVL LIST GMBH, Graz (AT)

(72) Inventors: Gerhard Schagerl, Graz (AT); Peter Schoeggl, Hitzendorf (AT); Rupert Scheucher, Graz (AT); Ull Thaler, Graz (AT); Juergen Pauritsch, Graz (AT); Florian Petzner, Stadl an der Mur (AT)

(73) Assignee: AVL LIST GMBH (AT)

( * ) Notice: Subject to any disclaimer, the term of this patent is extended or adjusted under 35 U.S.C. 154(b) by 284 days.

(21) Appl. No.: 15/542,020

(22) PCT Filed: Jan. 5, 2016

(86) PCT No.: PCT/EP2016/050078
§ 371 (c)(1),
(2) Date: Jul. 6, 2017

(87) PCT Pub. No.: WO2016/110488
PCT Pub. Date: Jul. 14, 2016

(65) Prior Publication Data
US 2018/0024019 A1    Jan. 25, 2018

(30) Foreign Application Priority Data

Jan. 8, 2015    (DE) .......................... 10 2015 200 157

(51) Int. Cl.
*G09B 9/42* (2006.01)
*G01L 5/28* (2006.01)
(Continued)

(52) U.S. Cl.
CPC ................ *G01L 5/288* (2013.01); *G01L 5/28* (2013.01); *G01M 17/007* (2013.01); *G09B 9/05* (2013.01)

(58) Field of Classification Search
CPC ........................................................ G01L 5/288
(Continued)

(56) References Cited

U.S. PATENT DOCUMENTS 5,323,644 A    6/1994 Schaefer
2014/0297098 A1    10/2014 Yoshimoto et al.

FOREIGN PATENT DOCUMENTS

CN    103 926 082 A    7/2014
DE    39 22 570 A1    4/1990
(Continued)

OTHER PUBLICATIONS

English Translation of International Preliminary Report on Patentability for International (PCT) Patent Application No. PCT/EP2016/050078, dated Jul. 20, 2017, 11 pages.
(Continued)

*Primary Examiner* — Kesha Frisby
(74) *Attorney, Agent, or Firm* — Sheridan Ross P.C.

(57) ABSTRACT

The invention relates to a method for operating a driving simulator having the following steps: detecting a braking request in the driving simulator, in particular on the basis of actuation of a brake actuator; converting the detected braking request into at least one braking signal suitable for characterising the braking request; transmitting the at least one braking signal from the driving stimulator to a test bench on which are mounted at least part of a drivetrain with at least one axle section of a vehicle, in particular an axle half, and at least one brake associated with the at least one axle section; rotating the at least one axle section at a wheel speed which corresponds to a predefined speed of the vehicle; actuating the at least one brake of the vehicle on the basis of the at least one braking signal; setting a predefined torque or a predefined wheel speed of at least one axle section of the at least one dynamometer on the basis of properties of at (Continued)

Figure 1:
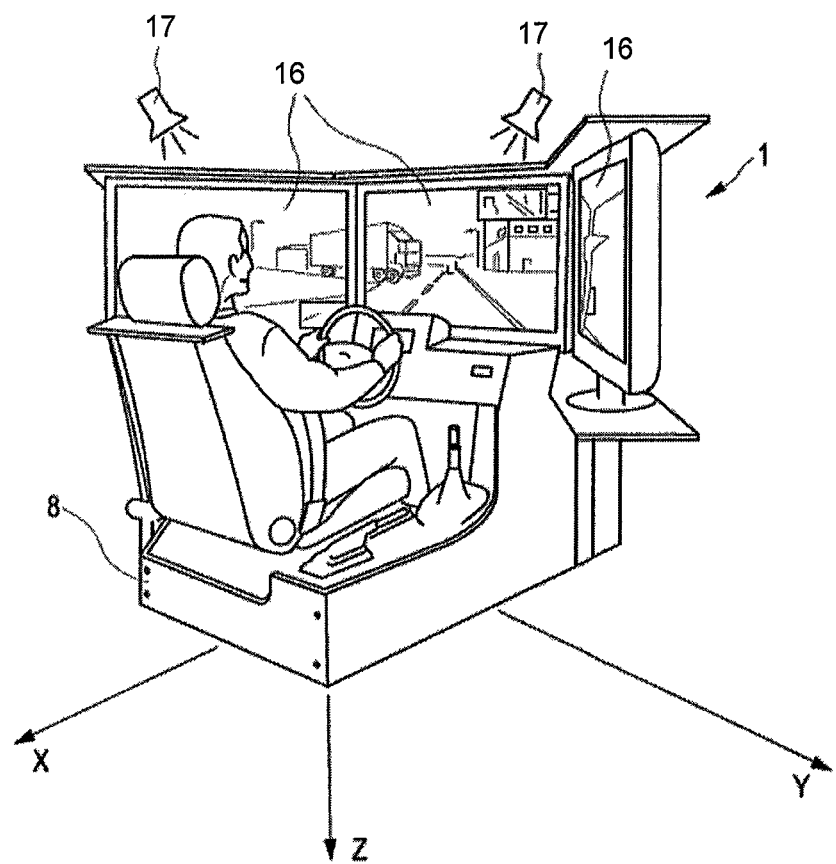

least one component of the vehicle, in particular of the drivetrain, of the vehicle and/or of the entire vehicle, wherein the properties are at least partially simulated; detecting the actual wheel speed at a predefined torque or the actual torque at a predefined wheel speed; and outputting the actual wheel speed or the actual torque to the driving simulator.

21 Claims, 4 Drawing Sheets

(51) Int. Cl.
  *G09B 9/05* (2006.01)
  *G01M 17/007* (2006.01)
(58) Field of Classification Search
  USPC .......................................................... 434/69
  See application file for complete search history.

(56) References Cited

FOREIGN PATENT DOCUMENTS

| DE | 195 05 533 A1 | 8/1996 |
| DE | 197 42 627 A1 | 4/1998 |
| DE | 102 36 620 A1 | 2/2004 |
| EP | 0 360 996 A2 | 4/1990 |

OTHER PUBLICATIONS

International Search Report and Written Opinion prepared by the European Patent Office dated Apr. 5, 2016, for International Application No. PCT/EP2016/050078.
German Search Report dated Aug. 17, 2015 for German Patent Application No. 10 2015 200 157.1.

METHOD FOR OPERATING A DRIVING SIMULATOR

CROSS REFERENCE TO RELATED APPLICATIONS

This application is a national stage application under 35 U.S.C. 371 and claims the benefit of PCT Application No. PCT/EP2016/050078 having an international filing date of 5 Jan. 2016, which designated the United States, which PCT application claimed the benefit of German Patent Application No. 10 2015 200 157.1 filed 8 Jan. 2015, the disclosure of each of which are incorporated herein by reference in their entireties.

The invention relates to an apparatus for testing brakes which comprises a test bench and a driving simulator as well as a method for operating such a driving simulator.

A driving simulator in the sense of the present invention is to be understood as an apparatus which allows simulating the driving operations of various different vehicles in the most realistic way possible. Such apparatus typically serve in simulating the driving operations of road vehicles, in particular race cars. In principle, however, a driving simulator as defined by the invention can also be used in the case of other vehicles.

In the racing sector, in which training times in the actual vehicle are generally strictly regulated, new developments can be economically tested using driving simulators and known racetrack courses can be practiced prior to a race or the season independently of additional training runs. Further areas of application of a driving simulator according to the invention as well as the inventive apparatus for testing brakes are in the areas of vehicle development, road safety, mobility, integral safety, driver assistance systems and basic automotive research.

Driving simulators generally have an image reproduction device for portraying an actual or computer-generated view of the vehicle's surroundings. Virtual reality techniques are thereby preferably used in order to give a driver in the driving simulator the most realistic impression of the surroundings as possible. The driver is thereby generally situated in a cockpit which has a seat, instrument panel, control elements with force feedback, rearview mirror and/or other control elements; a so-called seat box. Such a seat box can either be realized generically or, if need be, model-specific, and ergonomically and functionally corresponds to the cockpit of an actual passenger car, including, for example, the view through the front and side windows, the interior and exterior mirrors as well as the relevant features of the car body (e.g. A and B-pillars, center console, interior, the door from the inside, etc.).

Preferably, such a seat box is firmly, in particular rigidly, attached to a movement apparatus of the driving simulator which allows actively controlled or regulated movement of the seat box relative to the machine frame of the driving simulator by predetermined degrees of freedom. Preferably, an entire vehicle or at least parts of the vehicle's car body can be installed in the driving simulator in order to enable the most faithful simulation possible for the driver.

Further preferably, driving simulators have means for acoustically reproducing a vehicle's surroundings. This acoustic reproduction, particularly by means of a plurality of speakers, allows completing the virtual reality presented to the driver also in terms of sound.

Various different designs of such driving simulators are known in the prior art:

AT 514 404 A2 describes a driving simulator having a machine frame which can be moved on a foundation by means of three, preferentially four or more, wheel assemblies, wherein each wheel assembly comprises at least one wheel which is able to move on the foundation and is rotatably arranged about a longitudinal axis, wherein the machine frame is coupled to a control encompassing a one-person seat as well as control elements for controlling the driving simulator.

DE 20 2012 006 551 U1 describes a driving simulator for simulating the movement of a motor vehicle which comprises a base plate on which a test vehicle can be placed as well as a plurality of actuators arranged on the base plate and connected to the test vehicle for simulating vertical and/or longitudinal and/or lateral acceleration and/or pitch and/or roll angles of the test vehicle, whereby the actuators are operatively connected to the test vehicle by means of at least one adapter plate mountable to the chassis of the test vehicle.

DE 10 2009 000 929 A1 describes a driving simulator comprising a cockpit with a driver's seat and vehicle control elements, a visualization system for portraying the surroundings of the moving vehicle visible to the driver during simulation operation, an enclosure able to screen the driver from visual influences external of the driving simulator, and a movement system for jointly moving the cockpit, the visualization system and the enclosure relative to a supporting contact area of the driving simulator.

Further known in the prior art are vehicle test benches with which brake function can be tested. DE 10 2007 012 545 A1 thus discloses a vehicle test bench with which a vehicle is disposed on rollers. The test bench comprises a device for automated pedal actuation which can be used to actuate the brake pedal in order to run automated brake tests.

Taking this prior art into consideration, a task of the invention is that of providing an apparatus for testing a brake assembly which is able to perform the braking function of one or all brakes under the most realistic conditions possible and generate data which can be used to operate a driving simulator. The invention further relates to a method for operating a driving simulator on the basis of this data.

This task is solved by a method for operating a driving simulator in accordance with claim 1 and an apparatus for testing brakes in accordance with claim 13. Advantageous embodiments are claimed in the subclaims. The claim wording is expressly incorporated into the content of the description by reference.

The method according to the invention for operating a driving simulator comprises the following steps: detecting a braking request in the driving simulator, in particular on the basis of actuation of a brake actuator; converting the detected braking request into at least one braking signal suitable for characterizing the braking request; transmitting the at least one braking signal from the driving simulator to a test bench on which are mounted at least part of a drivetrain of a vehicle having at least one axle section, in particular an axle half, and at least one brake associated with the at least one axle section; rotating the at least one axle section at a wheel speed which corresponds to a predefined speed of the vehicle; actuating the at least one brake of the vehicle on the basis of the at least one braking signal; setting a predefined torque or a predefined wheel speed at the at least one axle section by means of at least one dynamometer based on properties of at least one component of the vehicle, in particular the drivetrain, the chassis and/or of the entire vehicle, wherein the properties are at least partially simulated; detecting the actual wheel speed at a predefined torque or the actual torque at a predefined wheel speed; and outputting the actual wheel speed or the actual torque to the driving simulator.

The apparatus according to the invention for testing a brake assembly of a vehicle preferably comprises a test bench configured to accommodate a vehicle or relevant sections of the vehicle respectively. This refers to at least a section of a drivetrain having at least one axle section, in particular an axle half, and at least one brake associated with the at least one axle section. The apparatus preferably further comprises a vehicle simulator with a seat box having a brake actuator and configured to generate an acoustic and/or visual simulation of movement of the vehicle and to move the seat box commensurate to the vehicle movement. The seat box comprises in particular at least one control station and/or at least one section of the vehicle. A signal connection is preferably established between the control station and the driving simulator for transmitting at least one braking signal from the driving simulator to the test bench. The apparatus further comprises a data connection provided to transmit at least data related to actual wheel speed and/or actual wheel torque from the test bench to the driving simulator. Preferably, at least one dynamometer of the apparatus is configured so as to be torque-proofly connected to at least one axle section, in particular an axle half of the drivetrain section, wherein the apparatus has one respective dynamometer per each brake to be tested.

A braking request in the sense of the invention is a braking action requested in particular by the driver or by an automated driving system, in particular by actuation of a brake actuator, for example a brake pedal having a brake piston.

An axle section in the sense of the invention is a section of an axle which, in the case of vehicles, has in particular two wheels at each end. In particular, an axle section in the sense of the invention is an axle half equipped to support a wheel.

A dynamometer in the sense of the invention is a, preferably electric, machine, able to apply a positive or negative force, or torque respectively, to the axle section, thus capable of being operated both as a generator as well as a motor, in particular a so-called active dynamometer. Preferably, the dynamometer comprises a force gauge, in particular for measuring torque.

A component of a vehicle in the sense of the invention is an individual component or component assembly of a vehicle.

Wheel speed in the sense of the invention is the rotational speed at which a wheel would turn if mounted on an axle section. This rotational speed corresponds to the rotational speed able to be measured at the axle section.

Properties of components in the sense of the invention are all the characteristics of the components which contribute to how the vehicle handles when driving, in particular their masses which produce a braking torque upon being decelerated from linear or rotating motion. Properties in the sense of the invention generally designate input parameters of the inventive method.

A vehicle in the sense of the invention is an aircraft or a ground vehicle, in particular, however, a motor vehicle.

Actual wheel speed and actual torque in the sense of the invention comprises information on speed and/or torque values measured at the at least one axle section.

A brake in the sense of the invention comprises in particular all the components necessary for decelerating the rotational movement of a wheel or respectively an axle section, in particular axle half; i.e. in the case of a disc brake, at least the brake disc and caliper with brake pads as well as any applicable hydraulic, pneumatic and/or suspension elements.

A brake assembly in the sense of the invention comprises at least one brake as well as any further elements as applicable for connecting one or more brakes to a brake actuator.

The invention is based on the concept of supporting a virtual driving experience for a driver or also a system for evaluating the handling and/or the driveability of a vehicle (e.g. AVL Drive) by incorporating measured physical values from at least one part of a drivetrain of a vehicle in such a way that the driving experience comes as close as possible to the driving experience in an actual motor vehicle. The invention is thereby in particular based on the knowledge that it is hard to simulate the handling of a vehicle during braking since the frictional forces acting on the surfaces involved in braking, e.g. the brake linings and brake discs, cannot be exactly simulated in numeric terms, particularly due to the plurality of input parameters. In addition to the nature of the surfaces, external influences also become hard-to-simulate influencing factors such as the flow conditions at the brake, airflow, climatic conditions or even traffic condition-based influences based on driving speed, direction of motion and wind conditions.

In accordance with the invention, the braking behavior of a vehicle to be tested is preferably determined on a test bench using measurements. At least one part of a drivetrain, in particular an axle section or axle half respectively, in particular with wheel mount for the vehicle to be tested, is thereby mounted on the test bench. A braking action performed by these actual components of the vehicle takes into account not only the actual interaction between the elements of the brake but also any drivetrain deviations there may be from values stored in a simulation. Moreover, actual environmental conditions can be produced across the entire drivetrain or even just in the region of the individual brakes such that these influencing factors can also be factored into the measurement. The at least one dynamometer of the test bench enables in particular the simulating of engine propulsion braking, e.g. automatic transmission at crawl speed, or downhill stretch travel; preferably, however, the at least one dynamometer also enables simulating test bench braking without a propulsion element.

In one advantageous embodiment of the inventive method, same further comprises the step of adapting a visual and/or acoustic simulation in the driving simulator based on the actual wheel speed or the actual torque. Adapting a visual or acoustic simulation in the driving simulator can intensify the driving experience in the driving simulator by providing visual and audible impressions.

In a further advantageous embodiment of the inventive method, same further comprises the step of moving a seat box of the driving simulator, in particular at least one control station and/or at least one section of the vehicle, at least on the basis of the actual wheel speed or the actual torque, in particular on the basis of accelerations derived from the actual wheel speed or the actual torque. Seat box movement in particular conveys an actual driving experience in the driving simulator.

In a further advantageous embodiment of the inventive method, same further comprises the step of at least partially simulating the actuation of the at least one brake of the vehicle upon a limit of an actual braking pressure of the at least one brake being reached. A full brake actuator braking or braking request demand respectively, which would require very strong braking force, can overload dynamometers and damage or at least disable them. Therefore, it is advantageous to limit the braking pressure, e.g. by means of a valve in the case of a hydraulic brake line between the brake actuator and the brakes, and to simulate that part of the braking action which exceeds the limitation.

Braking pressure exceeding the limitation is thus not omitted from the determination of the braking behavior values but rather factored into the vehicle simulation such that the actual torque or wheel speed output comprises realistic values even though the braking pressure is limited.

In a further advantageous embodiment of the inventive method, the setting of the predefined torque or the predefined second wheel speed at the at least one axle section further takes into account aerodynamic drag, climbing resistance or ground resistance, wherein at least one of these resistances is preferably simulated. Ideally, all of the driving resistances acting on the vehicle and/or its components are factored into the output of actual wheel speed or actual torque.

In a further advantageous embodiment of the inventive method, additional parts of the drivetrain for the at least one axle section, preferably of a vehicle substantially as above, are mounted on the test bench.

In a further advantageous embodiment of the inventive method, the at least one part of the drivetrain comprises a plurality of axle sections, each associated with one respective wheel of the vehicle, and the predefined torque or the predefined second wheel speed of the axle section is individually set for each individual axle section. This thus enables the braking pressure to be discriminatingly allocated between the individual brakes in the measurements or also different environmental conditions, e.g. road adherence, to be realized at the individual wheels or brakes respectively. Differing allocations of propulsion on the individual wheels can also be realized in this way.

A further advantageous embodiment of the inventive method simulates actual flow conditions of at least one fluid, in particular water and/or air, around the at least one brake of the vehicle.

A further advantageous embodiment of the inventive method simulates vehicle airflow as a function of driving speed, preferably also of direction of motion and/or wind conditions.

A further advantageous embodiment of the inventive method simulates climatic conditions and/or traffic conditions around the vehicle.

A further advantageous embodiment of the inventive method at least partially simulates flow conditions around the at least one brake, airflow, climatic conditions and/or traffic conditions around the vehicle.

In a further advantageous embodiment of the inventive method, the steps of the method are repeated over a predefined test period.

The above-described aspects of the invention and the associated features and advantages disclosed in the further development of the method for operating a driving simulator also apply correspondingly to the aspects of the invention described in the following and the associated features and advantages disclosed in the further development of the apparatus for testing a brake assembly and vice versa.

In one advantageous embodiment of the apparatus according to invention, the test bench is further equipped to simulate actual flow conditions of at least one fluid, in particular water and/or air, on the at least one brake of the vehicle.

In a further advantageous embodiment of the inventive apparatus, the driving simulator comprises means for reproducing a virtual reality, in particular a visual reproduction apparatus and/or an audio reproduction apparatus, and/or is configured to move the seat box in at least six spatial degrees of freedom.

In a further advantageous embodiment of the inventive apparatus, the test bench further comprises at least one fan, at least one temperature control device and/or at least one sprayer device in order to stimulate the actual flow conditions on the at least one brake, the airflow, the climatic conditions and/or the traffic conditions as a function of driving speed, direction of motion, wind conditions, climatic conditions and/or traffic conditions.

In a further advantageous embodiment of the inventive apparatus, at least one fan, one temperature control device and/or one sprayer device is provided per each brake to be tested. Doing so allows inducing different environmental conditions at each brake, which enables particularly realistic reproduction on the test bench.

In a further advantageous embodiment of the inventive apparatus, the test bench comprises a flow channel and/or a cold chamber. This enables all the components mounted on the test bench to be subjected to realistic operating scenarios.

In a further advantageous embodiment of the inventive apparatus, the signal connection comprises an apparatus, in particular a valve, for limiting actual braking pressure. This thereby prevents one or more dynamometers from being so drastically decelerated due to excessive pressure so as to shut down or even suffer damage.

In a further advantageous embodiment, the signal connection is a hydraulic line and the braking signal is a hydraulic pressure. This signal connection is particularly advantageous even if a hydraulic brake is provided in the vehicle to be tested.

In a further advantageous embodiment of the inventive apparatus, the driving simulator comprises a brake pedal and a brake actuator cylinder as a brake actuator which is configured to adjust for changes in the braking signal, in particular an attenuating and/or delay induced by the signal connection. Particularly a spatial separation between the driving simulator and the test bench can make a longer signal connection, in particular a brake hose, necessary than in the actual vehicle. In a hydraulic brake assembly, the long line reduces the system's rigidity and changes the driver's perception of the brake pedal. This can thereby be prevented by making changes to the brake cylinder of the brake actuator in order to achieve the same rigidity as in regular operation or also by adapting the pressure in the brake line or, for example, by a pressure repeater bridging the additional length of the brake hose.

Figure 2A:
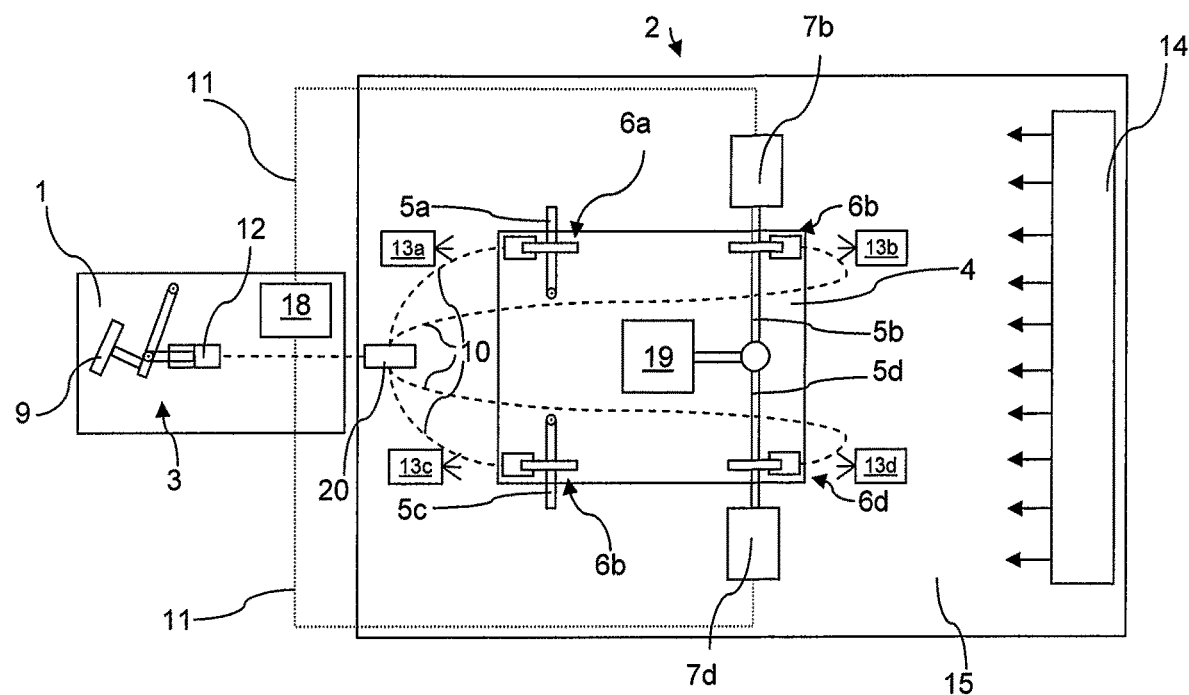
Figure 2B:
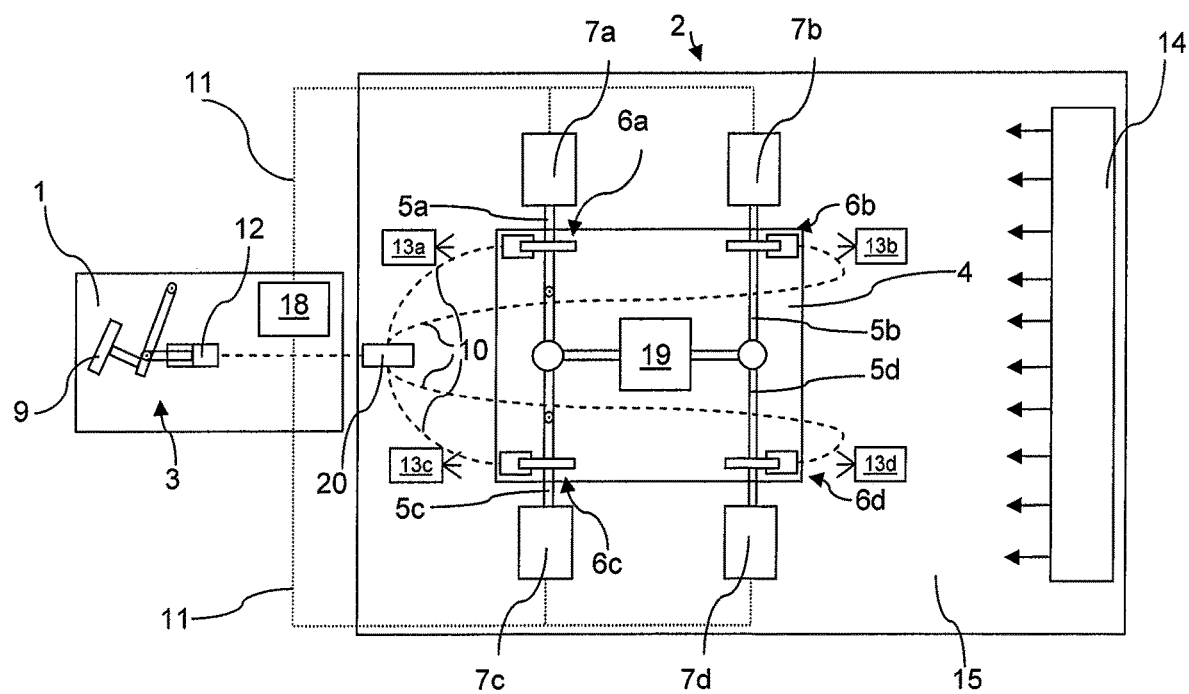
Figure 3A:
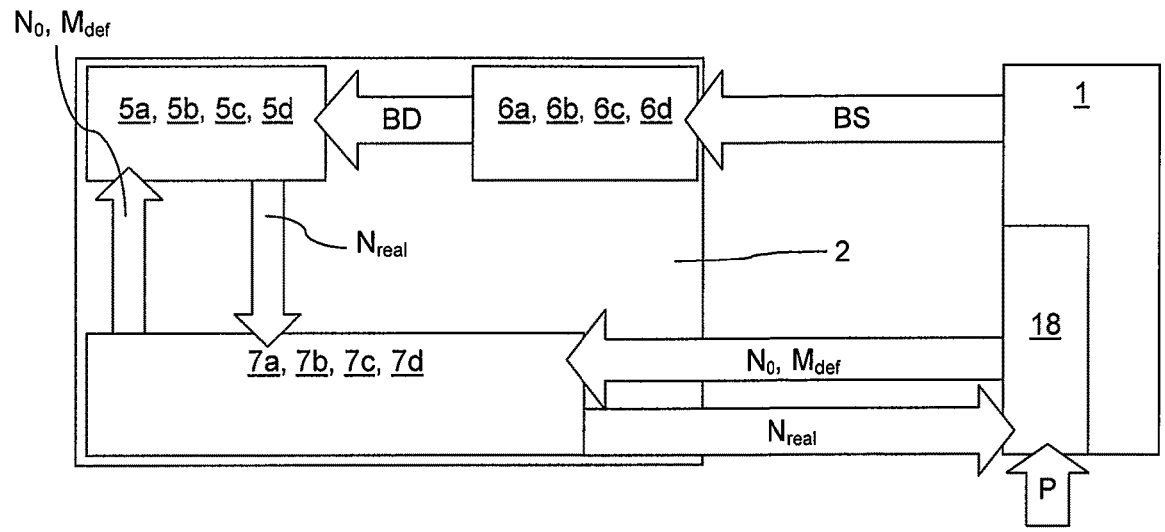
Figure 3B:
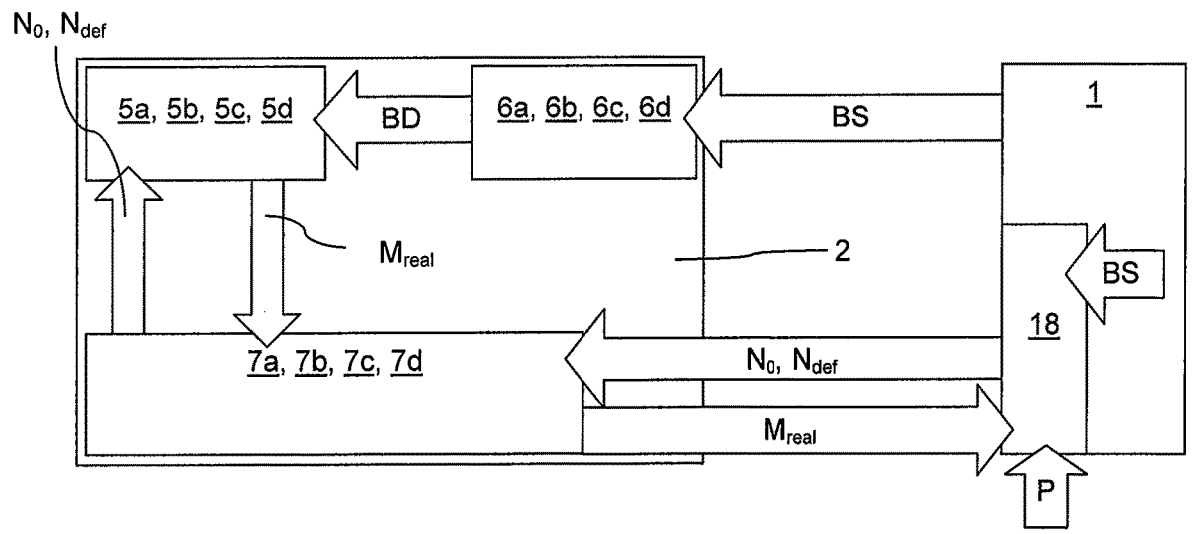
Figure 4:
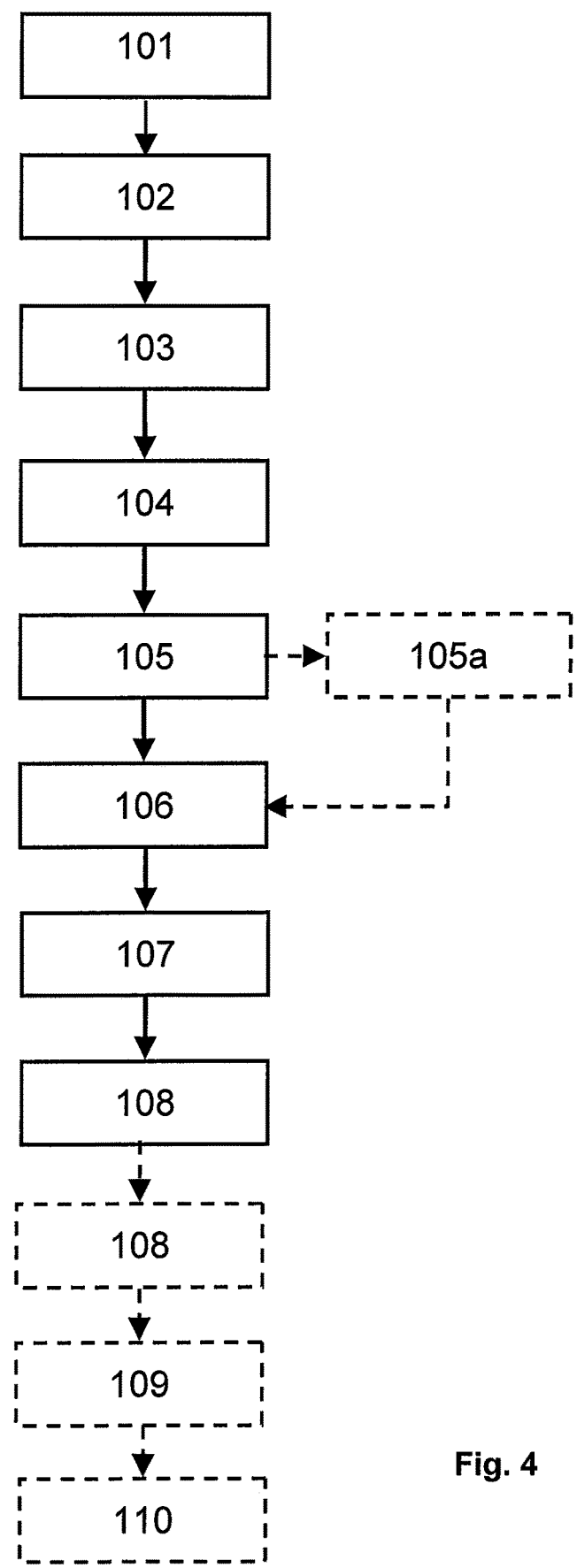

Example embodiments of the method for operating a driving simulator and the apparatus for testing a brake assembly as well as further advantages follow from the description below in conjunction with the figures, which in detail show:

FIG. 1 a partly schematic representation of a driving simulator of one embodiment of the apparatus according to the invention for testing a brake assembly;

FIG. 2*a* a partly schematic representation of a first embodiment of the inventive apparatus for testing a brake assembly on which a drivetrain of a rear-wheel drive vehicle is mounted;

FIG. 2*b* a partly schematic representation of a second embodiment of the inventive apparatus for testing a brake assembly on which a drivetrain of an all-wheel drive vehicle is mounted; and FIG. 3a a partly schematic diagram of the flow of information in the method according to the invention in a first embodiment;

FIG. 3b a partly schematic diagram of the flow of information in the method according to the invention in a second embodiment;

FIG. 4 a partial schematic flow chart of a first and second embodiment of the inventive method.

FIG. 1 shows a driving simulator as preferably used in an embodiment of the inventive apparatus for testing a brake assembly. The driving simulator preferably comprises a seat box 8 in which a seat for a driver is mounted. The seat box 8 is moreover preferably provided with means for reproducing a virtual reality, in particular with one or more image reproduction apparatus 16 which give the driver a visual impression of a virtual reality, and/or acoustic reproduction means 17, in particular speakers, which give the driver an audible impression of his surroundings. Preferably, the seat box 8 can realize, by means of a movement apparatus (not shown) of the driving simulator, translatory movements in the X, Y and Z directions as well as pitching movements about an axis parallel to the Y-axis, rolling movements about an axis parallel to the X-axis and yawing movements about an axis parallel to the Z-axis. Preferably, the seat box 8 can also move in further degrees of freedom. Further preferably, driving simulator 1 comprises a simulation computer 18 (not shown in FIG. 1). This can be both integrated into the driving simulator 1 or also disposed at a spatially separated location from same.

FIG. 2a shows a first embodiment of an apparatus for testing a brake assembly. Same preferably comprises a driving simulator 1 as well as a test bench 2. A drivetrain 4 of a vehicle can preferably be mounted on the test bench 2, its brake assembly to be tested as regards axle section 5b, 5d of the rear axle. For this purpose, the test bench 2 preferably has one respective dynamometer 7b, 7d per each axle section 5b, 5d to be tested which in particular corresponds to an axle half or to the brake 6b, 6d to be tested respectively. Preferably, both a predefined torque $M_{def}$ as well as a predefined wheel speed $N_{def}$ can be applied to the respective axle section 5b, 5d, preferably via the wheel mount, by means of a dynamometer 7b, 7d. Moreover, the respective dynamometers 7b, 7d are equipped to metrologically determine a torque $M_{real}$ or its wheel speed $N_{real}$ exerted by the respective axle section 5b, 5d. So as to be able to reproduce the drivetrain 4 as closely as possible, it is preferably further provided for the dynamometer 7b, 7d to be regulated such that its moment of inertia corresponds as closely as possible to the wheels of the vehicle with the drivetrain 4. In addition to the axle sections 5b, 5d, the drivetrain 4 at least comprises the brakes 6b, 6d to be tested, the brake disks of which are mounted to the respective axle section 5b, 5d in rotationally fixed manner and can be braked with brake shoes via a brake caliper. Preferably, other types of brakes such as drum brakes, etc., can also be provided on the drivetrain 4. The brakes 6b, 6d are controlled by means of the signal connection 10, in particular the hydraulic line of the brake assembly, via a braking signal BS. Preferably, other signal connections 10 such as hydraulic are also possible as are wired or wireless brake assemblies having electric motors for generating a braking force. In the embodiment depicted, the brake calipers apply a braking force via the brake shoes on the brake disks of the brakes 6a, 6b, 6c, 6d mounted on the axle sections 5a, 5b, 5c, 5d. Preferably, the test bench 2 is equipped with apparatus 13a, 13b, 13c, 13d able to produce actual flow conditions, airflow and/or environmental conditions on each of the respective brakes 6a, 6b, 6c, 6d and to that end, preferably comprise a fan, a temperature control device and/or a sprayer device. Preferably, the apparatus 13a, 13b, 13c, 13d can also be centralized in one apparatus for the entire test bench 2 or in one respective apparatus for each side of the drivetrain 4. Preferably, not only is just at least a part of the drivetrain 4 able to be mounted on the test bench 2 but rather the entire drivetrain 4 and/or parts of the chassis or even the entire vehicle. In order to be able to reproduce environmental conditions as realistically as possible, the test bench 2 preferably further comprises a flow channel 14 and/or a cold chamber 15 in which at least the at least one part of a drivetrain 4 is arranged.

Furthermore, a not-shown apparatus can preferably be provided for extracting brake dust.

The driving simulator 1 of the depicted first embodiment of the apparatus for testing a brake assembly is preferably arranged at a spatial separation from the test bench 2. In particular, the driving simulator 1 is arranged such that potential dangers emanating from the test bench 2, for example from flames and smoke in the case of an engine fire, pose no danger to a driver in the driving simulator 1. So doing also enables the testing of vehicles which would actually not be permitted to undergo testing with humans for safety-related reasons. Preferably, the simulator 1 also comprises, in addition to the functions already described in relation to FIG. 1, control switches and pedals of the vehicle having the brake assembly to be tested. In particular, the driving simulator 1 comprises a brake actuator 3 which in turn preferably comprises, in the case of a hydraulic brake as depicted, a brake pedal 9 and a brake actuator cylinder 12. Braking pressure BD is transmitted to the brakes 6a, 6b, 6c, 6d via the brake actuator cylinder 12 as well as the hydraulic line 10 and a brake pressure distributor 20. Further preferably, the driving simulator 1 comprises a simulation computer 18 which is arranged in the driving simulator 1 or, as was already depicted with respect to FIG. 1, spatially separated from the driving simulator 1. Preferably, the simulation computer 18 can also be arranged in the area of the test bench 2. Preferably, axle sections 5b, 5d are accelerated to an initial wheel speed No by means of drive 19. Alternatively thereto, however, dynamometers 7b, 7d could also be used. The brake pressure distributor 20 is preferably further designed as an apparatus for limiting actual braking pressure and, particularly in the case of a hydraulic brake assembly, as a valve. Further preferably, one or more such valve(s) for limiting the actual braking pressure can also be arranged in the signal connections 10 separately from the brake pressure distributor 20. Such an apparatus 20 for limiting the braking pressure can prevent the at least one dynamometer 7b, 7d from switching off due to overload or even suffering damage during motor operation.

Data generated on the test bench 2 can be transmitted to the driving simulator 1, in particular to the simulation computer 18, preferably via a data connection 11. The simulation computer 18 is preferably configured to factor the data into the further simulation.

The second embodiment in FIG. 2b of the inventive apparatus for testing a brake assembly differs from the structure depicted in FIG. 2a substantially in that the test bench 2 has four dynamometers 7a, 7b, 7c, 7d. Such a structure is particularly suitable when a drivetrain 4, or a vehicle with four-wheel drive or with road-coupled hybrid drive respectively, is mounted on the test bench 2. Here, the front axle with the axle sections or axle halves 5a, 5c respectively are also actuated by the drive 19, in particular an internal combustion engine or a further (electric) motor. A test bench having one dynamometer 7a, 7b, 7c, 7d per given axle half, or brake 6a, 6b, 6c, 6d respectively, can however also be employed when only one of a vehicle's axles is motor driven. The non-driven axle halves or wheels respectively can in this case by turned by rollers or also by the respective dynamometer 7a, 7b, 7c, 7d in order to achieve an initial wheel speed $N_0$.

FIG. 3a depicts a functional principle of a first embodiment of the method according to the invention. The simulation computer 18, which is preferably part of the driving simulator 1, provides a first wheel speed No at which the axle sections 5a, 5b, 5c, 5d are turned to the at least one dynamometer 7a, 7b, 7c, 7d. The at least one dynamometer 7a, 7b, 7c, 7d is hereby running in motor operation. Alternatively, the first wheel speed No can also be set via the drive 19 of the drivetrain 4 of the vehicle with the brake assembly to be tested. Once the wheel speed No is reached, the at least one dynamometer 7a, 7b, 7c, 7d thus exerts a predefined torque $M_{def}$ on the rotating axle sections 5a, 5b, 5c, 5d against the direction of rotation so that the rotational motion is braked. The torque $M_{def}$ is thereby determined by the simulation computer 18 based on the properties P of the vehicle of the brake assembly to be tested.

This torque $M_{def}$ is provided to the at least one dynamometer 7a, 7b, 7c, 7d which sets it at the respective axle section 5a, 5b, 5c, 5d. A braking request of the driver in the simulator 1 is converted into a braking signal BS which is transmitted to the brakes 6a, 6b, 6c, 6d. The caliper of the brakes 6a, 6b, 6c, 6d produce a braking pressure BD which is applied to the brake disks connected in rotationally fixed manner to the axle sections 5a, 5b, 5c, 5d so as to decelerate the rotation of axle sections 5a, 5b, 5c, 5d. The resulting actual wheel speed $N_{real}$ is measured by the at least one dynamometer 7a, 7b, 7c, 7d or a further tachometer and preferably provided to the simulation computer 18 which accordingly adapts the simulation for the driver in the driving simulator 1.

FIG. 3b depicts a functional principle of a second embodiment of the method according to the invention for operating a driving simulator. In contrast to the first embodiment, which is described with reference to FIG. 3a, the simulation computer 18 does not calculate a predefined torque $M_{def}$ but rather a predefined second wheel speed $N_{def}$ and outputs same to the at least one dynamometer 7a, 7b, 7c, 7d. The predefined wheel speed $N_{def}$ is thereby calculated on the basis of the properties P as well as on the basis of a braking signal generated by a braking request of a driver in the driving simulator 1 which is likewise provided to the simulation computer 18 as an input parameter. The dynamometers 7a, 7b, 7c, 7d attempt to achieve this predefined wheel speed $N_{def}$ at all times by applying torque. The actual torque $M_{real}$ exerted on the axle sections 5a, 5b, 5c, 5d by the braking pressure of the brake caliper on the brakes 6a, 6b, 6c, 6d via the brake disks can thereby be concluded. This actual torque $M_{real}$ is in turn preferably output to the simulation computer 18 which accordingly adapts the simulation in the driving simulator 1.

FIG. 4 depicts a flow chart of the first and second embodiment of the inventive method for operating a driving simulator 1. The steps of the method are thereby not limited to the order as depicted but rather instead indicate the functional relationship between the respectively determined or specific information, the functional principles of which are depicted referencing the two embodiments in FIGS. 2a and 2b.

Preferably, a braking request of a driver in the driving simulator 1 is first detected 101, in particular on the basis of the driver actuating the brake actuator 3, preferably the brake pedal 9, which acts on the brake actuator cylinder 12. The brake actuator 3, in particular the brake actuator cylinder 12, converts 102 the braking request into preferably at least one braking signal BS suitable for characterizing the braking request. This braking signal BS is preferably transmitted 103 from the driving simulator 1 to a test bench 2, as described above with reference to FIGS. 2a and 2b.

In order to test the operation of the brakes 6a, 6b, 6c, 6d or the entire brake assembly respectively using the braking request or the braking signal BS respectively, preferably at least one axle section 5a, 5b, 5c, 5d is driven 104 to a first initial wheel speed No. This first initial wheel speed No corresponds preferably to a vehicle speed at which the brakes 6a, 6b, 6c, 6d, or brake assemblies respectively, are to be tested. The first initial wheel speed No can thereby be set by the at least one dynamometer 7a, 7b, 7c, 7d of the test bench 2 or also by the drive 19; i.e. the vehicle's engine. Preferably, the first initial wheel speed $N_0$ can be predetermined by simulating the vehicle's normal driving.

Based on the braking signal BS generated, at least one brake 6a, 6b, 6c, 6d of the vehicle is actuated 105. The actuating of the at least one brake 6a, 6b, 6c, 6d is thereby preferably partially simulated 105a upon a limitation of an actual braking pressure BD of the at least one brake 6a, 6b, 6c, 6d being reached. As described above, such a limitation can be necessary to protect the at least one dynamometer 7a, 7b, 7c, 7d.

When the at least one axle section 5a, 5b, 5c, 5d with the at least one dynamometer 7a, 7b, 7c, 7d or the drive 19 has been driven to the first initial wheel speed No, the at least one dynamometer 7a, 7b, 7c, 7d enters into motorized operation against the torque direction of the axle sections 5a, 5b, 5c, 5d and sets 106 either a predefined torque $M_{def}$ or a predefined second wheel speed $N_{def}$ at the at least one axle section 5a, 5b, 5c, 5d. Preferably, the predefined torque $M_{def}$ or the predefined second wheel speed $N_{def}$ is determined based on the moment of inertia of the rotating components of the drivetrain 4 and the moments of inertia of the linearly moved components of the vehicle with the brake assembly to be tested. These moments of inertia and further characteristics of the vehicle as applicable are preferably integrated as properties P. The actual wheel speed $N_{real}$ (at predefined torque $M_{def}$) or the actual torque $M_{real}$ (at predefined second wheel speed $N_{def}$) resulting from the interplay between the first initial wheel speed $N_0$ and the predefined torque $M_{def}$ or the predefined second wheel speed $N_{def}$ is measured 107 and the respective value output 108, preferably to the driving simulator 1. Preferably, the moments of inertia or the properties P respectively of the vehicle components also factor in passenger weight, tank fill level and/or vehicle load.

Preferably, a visual and/or acoustic simulation in the driving simulator 1 is adapted 109 on the basis of the data on the actual wheel speed $N_{real}$ or actual torque $M_{real}$. Furthermore, the seat box 8 of the driving simulator 1 is also moved 110 preferably at least on the basis of the data on the actual wheel speed $N_{real}$ or actual torque $M_{real}$, in particular on the basis of acceleration derived from the actual wheel speed $N_{real}$ or actual torque $M_{real}$. The visual and/or acoustic movement simulation simulates the most realistic relationship between driver and vehicle handling as provided by the braking assembly or brakes 6a, 6b, 6c, 6d respectively. Upon actuation of at least one brake 6a, 6b, 6c, 6d, an actual airflow condition is preferably simulated 105 around the brake, and influences of climatic conditions and traffic conditions are also simulated preferably as a function of driving speed, preferably additionally to direction of motion and/or wind conditions. Doing so can thereby achieve the most realistic possible braking response or vehicle handling respectively upon braking. Further parameters which preferably enter into the simulation of the vehicle properties P or are realistically set on the at least one part of a drivetrain 4 on the test bench 2 include steering angle, clutch position, shifting requirements, engine control settings and throttle positions as well as preferably further parameters. On the one hand, this enables not only testing the brake assembly but also further components of the vehicle while, on the other hand, the data generated all the more further realistically approximates actual vehicle operation values in the vehicle and surroundings in simulation and/or on the test bench 2.

The inventive apparatus for testing a brake assembly and the method for operating a driving simulator 1 gives the driver full control of the braking force on the brake disks and direct feedback from rotating or blocked brake disks and the braking power resulting therefrom since the measured braking torque $M_{real}$ or the second actual wheel speed $N_{real}$ respectively inputs into the vehicle model of the driving simulator 1. This enables the entire brake assembly, the brake disk and/or the brake caliper to be tested and developed in terms of controllability by means of direct driver feedback without the need to conduct road tests on an actual test track to that end. This reduces expensive testing periods on the one hand and, on the other, the braking properties of the vehicle can be tested under the most realistic conditions possible right at an early stage of development in which, for example, a complete vehicle has not yet been constructed or is at least still only in the prototype stage.

LIST OF REFERENCE NUMERALS driving simulator 1
test bench 2
brake actuator 3
drivetrain 4
axle section 5a, 5b, 5c, 5d
brake 6a, 6b, 6c, 6d
dynamometer 7a, 7b, 7c, 7d
seat box 8
brake pedal 9
signal connection 10
data connection 11
brake actuator cylinder 12
fan/temperature control device/sprayer device 13a, 13b, 13c, 13d
  flow channel 14
  cold chamber 15
  means for virtual reality reproduction 16, 17
  simulation computer 18
  drive 19
  brake pressure distributor, valve 20
  properties P
  braking signal BS
  braking pressure BD
  initial first wheel speed $N_0$
  predefined second wheel speed $N_{def}$
  actual wheel speed $N_{real}$
  predefined torque $M_{def}$
  actual torque $M_{real}$

The invention claimed is:

1. A method for operating a driving simulator which comprises the following steps:
    detecting a braking request in the driving simulator, in particular on the basis of actuation of a brake actuator;
    converting the detected braking request into at least one braking signal suitable for characterizing the braking request;
    transmitting the at least one braking signal from the driving simulator to a test bench on which are mounted at least part of a drivetrain of a vehicle having at least one axle section, in particular an axle half, and at least one brake associated with the at least one axle section;
    rotating the at least one axle section at a first wheel speed which corresponds to a predefined speed of the vehicle;
    actuating the at least one brake of the vehicle on the basis of the at least one braking signal;
    setting a predefined torque or a predefined second wheel speed at the at least one axle section by means of at least one dynamometer based on properties of at least one component of the vehicle, in particular the drivetrain, a chassis, and/or of the entire vehicle, wherein the properties are at least partially simulated;
    detecting an actual wheel speed at the predefined torque or an actual torque at a predefined second wheel speed ($N_{def}$); and
    outputting data on the actual wheel speed or the actual torque to the driving simulator.

2. The method according to claim 1, further comprising the following step:
    adapting a visual and/or acoustic simulation in the driving simulator based on the data on the actual wheel speed or the actual torque.

3. The method according to claim 1, further comprising the following step:
    moving a seat box of the driving simulator, in particular at least one control station and/or at least one section of the vehicle, at least on the basis of the data on the actual wheel speed or the actual torque, in particular on the basis of accelerations derived from the actual wheel speed or the actual torque.

4. The method according to claim 1, further comprising the following step:
    at least partially simulating the actuation of the at least one brake of the vehicle upon a limit of an actual braking pressure of the at least one brake being reached.

5. The method according to claim 1, wherein the setting of the predefined torque or the predefined second wheel speed at the at least one axle section further takes into account aerodynamic drag, climbing resistance, and/or ground resistance, wherein at least one of these resistances is preferably simulated.

6. The method according to claim 1, wherein additional parts of the drivetrain for the at least one axle section of a preferably substantially complete vehicle are mounted on the test bench.

7. The method according to claim 1, wherein the at least one part of the drivetrain comprises a plurality of axle sections, each associated with one respective wheel of the vehicle, and wherein the predefined torque or the predefined second wheel speed of each axle section is individually set for each individual axle section.

8. The method according to claim 1, wherein actual flow conditions of at least one fluid, in particular water and/or air, is simulated around the at least one brake of the vehicle.

9. The method according to claim 1, wherein vehicle airflow is simulated as a function of driving speed, direction of motion, and/or wind conditions.

10. The method according to claim 1, wherein climatic conditions and/or traffic conditions are simulated around the vehicle.

11. The method according to claim 1, wherein flow conditions around the at least one brake, airflow, climatic conditions and/or traffic conditions around the vehicle are at least partially simulated.

12. The method according to claim 1, wherein the steps of the method are repeated over a predefined test period.

13. An apparatus for testing a brake assembly of a vehicle comprising:
- a test bench configured to accommodate at least part of a drivetrain of the vehicle having at least one axle section, in particular an axle half, and at least one brake associated with the at least one axle section, and
- a driving simulator comprising a seat box having a brake actuator and configured to generate an acoustic and/or visual simulation of movement of the vehicle and to move the seat box, in particular at least one control station and/or at least one section of the vehicle, commensurate to the vehicle movement,
- a signal connection established between the test bench and the driving simulator for transmitting at least one braking signal from the driving simulator to the test bench,
- a data connection provided to transmit at least data related to actual wheel speed ($N_{real}$) and/or actual torque ($M_{real}$) from the test bench to the driving simulator, and
- at least one dynamometer configured so as to be torque-proofly connected to the at least one axle section, in particular the axle half, of a section of the drivetrain, wherein the apparatus has one respective dynamometer per each brake to be tested, wherein the apparatus is provided to actuate the at least one brake of the vehicle on the basis of the at least one braking signal.

14. The apparatus according to claim 13, wherein the test bench is further equipped to simulate actual flow conditions of at least one fluid, in particular water and/or air, on the at least one brake of the vehicle.

15. The apparatus according to claim 13, wherein the driving simulator comprises means for reproducing a virtual reality, in particular a visual reproduction apparatus and/or an audio reproduction apparatus, and/or is configured to move the seat box in at least six spatial degrees of freedom.

16. The apparatus according to claim 13, wherein the test bench further comprises at least one fan, at least one temperature control device, and/or at least one sprayer device in order to stimulate actual flow conditions on the at least one brake, airflow, climatic conditions and/or traffic conditions as a function of driving speed, direction of motion and wind conditions, the climatic conditions and/or the traffic conditions.

17. The apparatus according to claim 13, wherein at least one fan, one temperature control device, and/or one sprayer device is provided per each brake to be tested.

18. The apparatus according to claim 13, wherein the test bench comprises a flow channel and/or a cold chamber.

19. The apparatus according to claim 13, wherein the signal connection comprises an apparatus, in particular a valve, for limiting an actual braking pressure.

20. The apparatus according to claim 13, wherein the signal connection is a hydraulic line and at least one the braking signal is a hydraulic pressure.

21. The apparatus according to claim 20, wherein the driving simulator comprises a brake pedal and a brake actuator cylinder as a brake actuator which is configured to adjust for changes in the at least one braking signal, in particular an attenuating and/or delay induced by the signal connection.

* * * * *